US008854928B1

(12) United States Patent
Kuehlwein

(10) Patent No.: US 8,854,928 B1
(45) Date of Patent: Oct. 7, 2014

(54) DIFFERENTIAL LASER DIODE DRIVER APPARATUS AND SYSTEMS

(71) Applicant: Texas Instruments Incorporated, Dallas, TX (US)

(72) Inventor: Jeremy Robert Kuehlwein, Woodbury, MN (US)

(73) Assignee: Texas Instruments Incorporated, Dallas, TX (US)

( * ) Notice: Subject to any disclaimer, the term of this patent is extended or adjusted under 35 U.S.C. 154(b) by 14 days.

(21) Appl. No.: 13/855,910

(22) Filed: Apr. 3, 2013

(51) Int. Cl.
*H01S 3/00* (2006.01)
*G11B 13/04* (2006.01)
*H01S 5/06* (2006.01)

(52) U.S. Cl.
CPC .. *G11B 13/04* (2013.01); *H01S 5/06* (2013.01)
USPC .................. 369/13.17; 372/38.02; 372/38.07; 372/38.03; 372/29.01; 372/29.015; 360/125.31; 360/46; 360/114.02; 369/13.24; 369/13.32; 369/13.33

(58) Field of Classification Search
None
See application file for complete search history.

(56) References Cited

U.S. PATENT DOCUMENTS

| 8,121,160 B2 | 2/2012 | Moto et al. | |
| 2005/0213623 A1* | 9/2005 | Ozasa et al. | 372/38.02 |
| 2006/0133435 A1* | 6/2006 | Ikeda | 372/38.02 |

* cited by examiner

*Primary Examiner* — Wayne Young
*Assistant Examiner* — Dionne Pendleton
(74) *Attorney, Agent, or Firm* — Alan A. R. Cooper; Frederick J. Telecky, Jr.

(57) ABSTRACT

Apparatus and systems create differential drive signals suitable for HAMR data recording. A laser diode differential driver provides heating current pulses at a time $\Phi 1$. The pulses energize a laser diode to pre-heat the magnetic medium to be written. Some embodiments duplicate portions of the laser diode circuit architecture to create a magnetic write head differential driver. The write head driver provides write current pulses to a magnetic write head in one direction with $\theta 1$ timing and in the opposite direction with $\theta 2$ timing. Both drivers utilize sets of reference voltages capable of being switched to one terminal or the other of the element to be driven. In the laser diode case, the common mode is split between the anode and cathode sections of the driver. A feedback element is added between the cathode and anode sections to provide current accuracy independent of the electrical characteristics of the selected laser diode.

20 Claims, 7 Drawing Sheets

US 8,854,928 B1

DIFFERENTIAL LASER DIODE DRIVER APPARATUS AND SYSTEMS

TECHNICAL FIELD

Structures described herein relate to semiconductor integrated circuits, including laser diode driver apparatus and heat assisted magnetic recording (HAMR) systems.

BACKGROUND INFORMATION

Social media and other technologies continue to drive the recording and archiving of large amounts of data, including voice, video and other high data rate files. In spite of inroads made by solid-state drive (SSD) and other non-magnetic mass storage technologies, the computer industry continues to look to the evolution of magnetic recording (so-called "HDD") technologies to satisfy the rapidly-increasing worldwide data storage demand.

One such technological evolution is a magnetic recording technique referred to as Heat Assisted Magnetic Recording ("HAMR"). Increasing storage densities require hard drive platter materials of increased magnetic coercivity. Such materials in turn require increasingly (and impractically) large magnetic fields to align the ferrous molecules below the write head and thus perform recording operations. However, it is known that the coercivity can be temporarily decreased for recording purposes by heating the recording position on the recording medium prior to applying the recording magnetic field. HAMR recorders pulse a laser beam from a laser diode focused on the recording position to heat the medium at the point of recording just prior to effecting the magnetic recording.

Thus, HAMR effectively requires two driver pulse streams, one to drive the pre-heat laser diode and one to drive the magnetic write head. Structures and techniques associated with signal drivers for current-technology HDD magnetic recording head technologies may not be suitable for HAMR and other advanced technologies. Likewise, structures and techniques associated with laser diode drivers used in current-technology optical recorders (e.g., CD, DVD, etc.) may not be suitable for HAMR and other ultra-density recording techniques. Tracking magnitude and timing parameters associated with the two pulse streams over temperature, process, and bias conditions may help to achieve planned HAMR write densities.

SUMMARY OF THE INVENTION

Apparatus and systems herein create differential drive signals suitable for HAMR data recording. A laser diode differential driver provides heating current pulses at times referred to herein as $\Phi 1$ phases or timing. The pulses energize a laser diode to pre-heat the magnetic medium to be written. Some embodiments also include a write head differential driver to provide write current pulses to a magnetic write head at times referred to herein as $\theta 1$ and $\theta 2$ phases or timing.

Although the load requirements are considerably different for the laser diode driver as compared to those of the magnetic recording head driver, embodiments of the two circuits herein are designed to be similar. Doing so results in a high degree of tracking between the heating and writing processes across bias current, temperature and process ranges.

Both drivers utilize sets of reference voltages capable of being switched to one terminal or the other of the element to be driven, whether laser diode or magnetic write head. In the laser diode case, the common mode is split between the anode and cathode sections of the driver. A feedback element is added between the cathode section output and the anode section common mode junction to provide current accuracy independent of the electrical characteristics of the selected laser diode.

DETAILED DESCRIPTION

Figure 1:
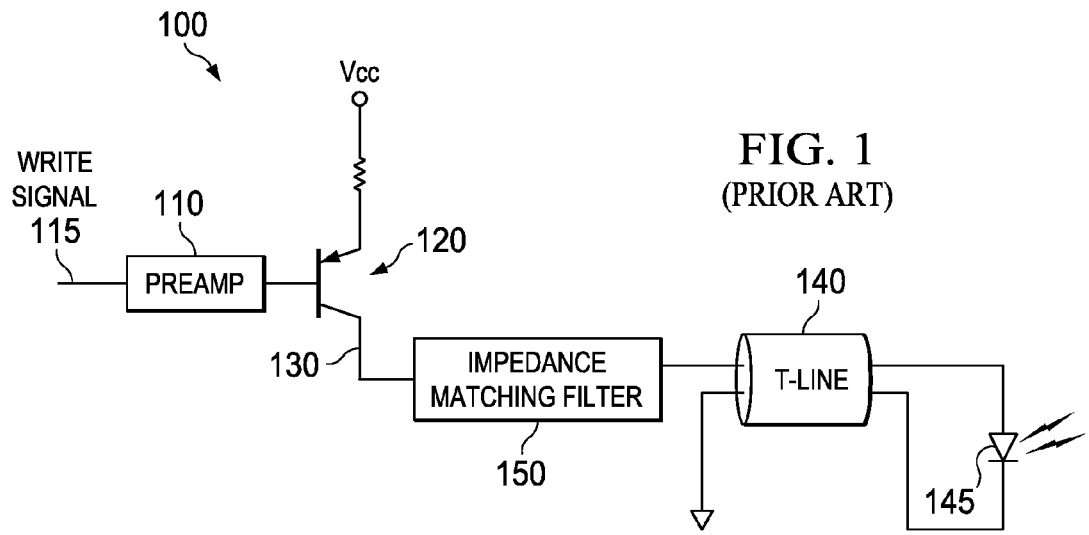
FIG. 1 is a block diagram of a prior art laser diode driver apparatus.

FIG. 1 is a block diagram of a prior art laser diode driver apparatus 100. The single-ended laser diode driver apparatus 100 includes a pre-driver 110 to amplify the write signal at input 115 and to drive the bipolar junction transistor (BJT) 120. However, the single ended output 130 has a high impedance characteristic as compared to the transmission line 140 being driven. Consequently, an impedance matching filter 150 is coupled between the output 130 and the transmission line 140. However, much of the drive signal destined for the laser diode 145 is wastefully shunted off by the impedance matching filter 150. Significant non-linearities may also be associated with the laser diode driver apparatus 100.

Figure 2:
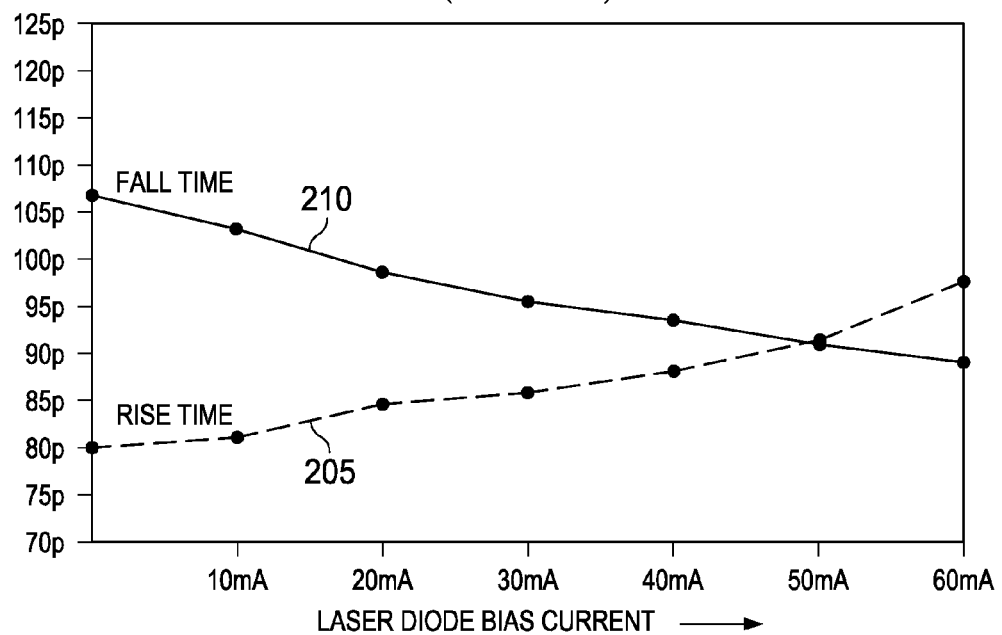
FIG. 2 is a data plot illustrating timing performance of the prior art laser diode driver apparatus of FIG. 1.

FIG. 2 is a data plot illustrating timing performance of the prior art laser diode driver apparatus of FIG. 1. Both the rise time 205 and the fall time 210 vary as a function of laser diode bias current. The rise and fall times 205 and 210 are also asymmetrical to each other as a function of laser diode bias current.

Figure 3:
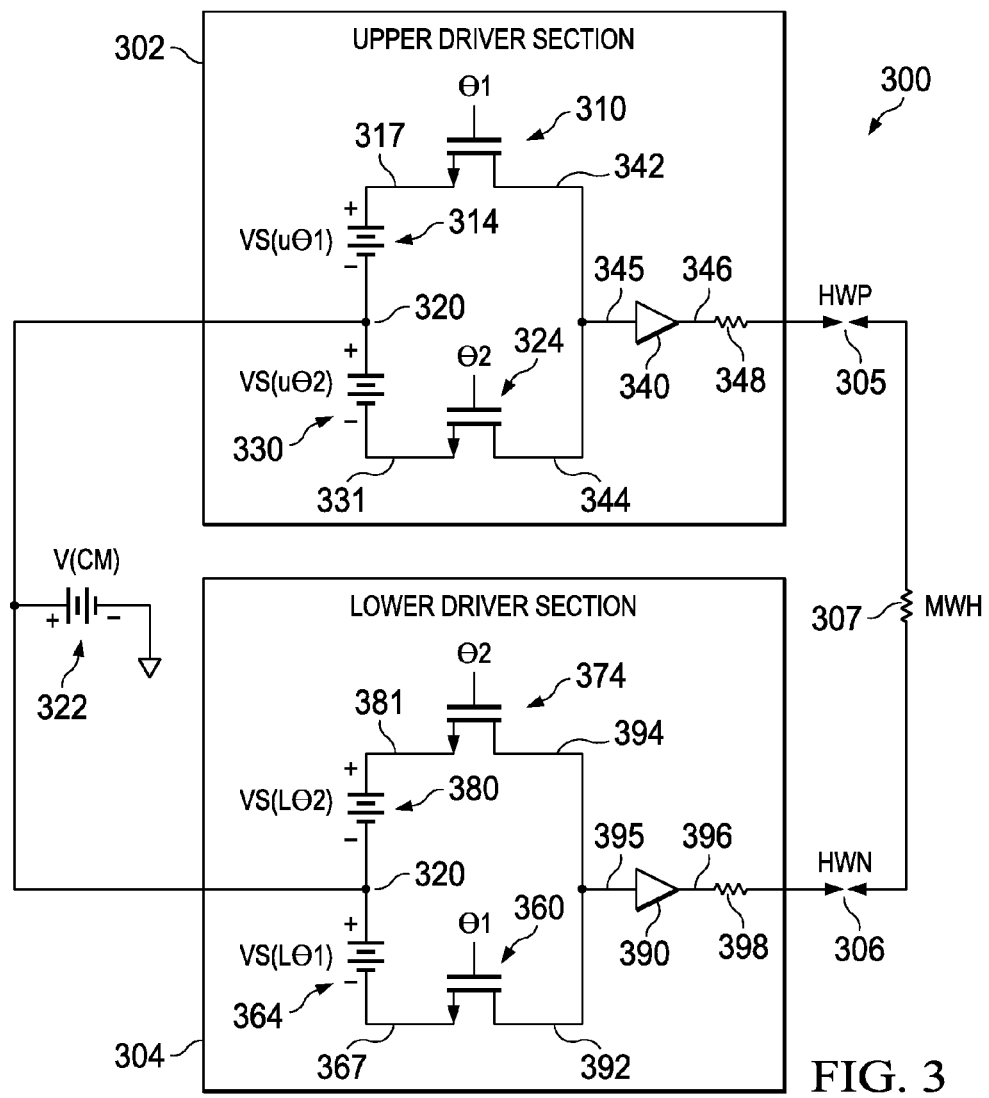
FIG. 3 is a circuit diagram of an HDD magnetic write head differential driver apparatus according to various example embodiments.

FIG. 3 is a circuit diagram of an HDD magnetic write head differential driver apparatus 300 according to various example embodiments. The driver apparatus 300 includes an upper driver section 302 and a lower driver section 304. The upper driver section 302 generates a voltage at an output HWP 305. The lower driver section 304 generates a voltage at output HWN 306. The differential voltage across HWP 305 and HWN 306 changes polarity for timing intervals referred to herein as "$\theta 1$ switching time" and "$\theta 2$ switching time" and may be applied to a magnetic write head 307. The apparatus 300 may be used in some embodiments of a HAMR HDD system, as further described below.

The magnetic write head driver apparatus 300 includes an upper section $\theta 1$ switch 310. The apparatus 300 also includes an upper section $\theta 1$ voltage source VS(U$\theta 1$) 314. The voltage source 314 is coupled between an input 317 of the upper section θ1 switch 310 and an upper section common mode junction 320 and generates an upper section θ1 reference voltage V(Uθ1). At θ1 switching time, the upper section θ1 switch 310 transfers reference voltage V(Uθ1) to the output HWP 305 of the upper section 302 of the write driver apparatus 300.

The driver apparatus 300 may also include a common mode voltage source VS(CM) 322. The common mode voltage source 322 is coupled to the common mode junction 320 to establish a common mode voltage.

The magnetic write head driver apparatus 300 further includes an upper section θ2 switch 324 and an upper section θ2 voltage source VS(Uθ2) 330. The voltage source 330 is coupled between an input 331 of the upper section θ2 switch 324 and the upper section common mode junction 320 and is polarized to generate a negative θ2 reference voltage V(Uθ2). At θ2 switching time, the upper section θ2 switch 324 transfers negative reference voltage V(Uθ2) to the output HWP 305 of the upper section 302 of the write driver apparatus 300.

In order to generate a desired switched output voltage, reference voltages V(Uθ1) and V(Uθ2) may be of different magnitudes. E.g., V(Uθ1) may be of greater absolute magnitude than V(Uθ2), as shown in subsequent examples.

The magnetic write head driver apparatus 300 may also include an upper section impedance matching buffer 340. The buffer 340 is coupled to an output 342 of the upper section θ1 switch and to an output 344 of the upper section θ2 switch. The buffer 340 may have unity gain and replicate signals from the buffer input 345 to the buffer output 346. The driver apparatus 300 may also include an upper section impedance matching resistor 348. The resistor 348 is coupled between the output 346 of the upper section impedance matching buffer 340 and the driver output HWP 305.

Turning now to the lower driver section 304, the magnetic write head driver apparatus 300 includes a lower section θ1 switch 360. The apparatus 300 also includes a lower section θ1 negatively polarized voltage source VS(Lθ1) 364. The voltage source 364 is coupled between an input 367 of the lower section θ1 switch 360 and the common mode junction 320 and generates a lower section θ1 negative reference voltage V(Lθ1). At θ1 switching time, the lower section θ1 switch 360 transfers negative reference voltage V(Lθ1) to the output HWN 306 of the lower section 304 of the write driver apparatus 300.

The magnetic write head driver apparatus 300 further includes a lower section θ2 switch 374 and a lower section θ2 positively polarized voltage source VS(Lθ2) 380. The voltage source 380 is coupled between an input 381 of the lower section θ2 switch 374 and the common mode junction 320 and generates a θ2 positive reference voltage V(Lθ2). At θ2 switching time, the lower section θ2 switch 374 transfers positive reference voltage V(Lθ2) to the output HWN 306 of the lower section 304 of the write driver apparatus 300.

In order to generate a switched output voltage, reference voltages V(Lθ1) and V(Lθ2) may be of different magnitudes. E.g., V(Lθ1) may be of greater absolute magnitude than V(Lθ2), as shown in subsequent examples.

The magnetic write head driver apparatus 300 may also include a lower section impedance matching buffer 390. The buffer 390 is coupled to an output 392 of the lower section θ1 switch and to an output 394 of the lower section θ2 switch. In some embodiments, the buffer 390 may have unity gain and replicate signals from the buffer input 395 to the buffer output 396. The driver apparatus 300 may also include a lower section impedance matching resistor 398. The resistor 398 is coupled between the output 396 of the lower section impedance matching buffer 390 and the driver output HWN 306.

Figure 4:
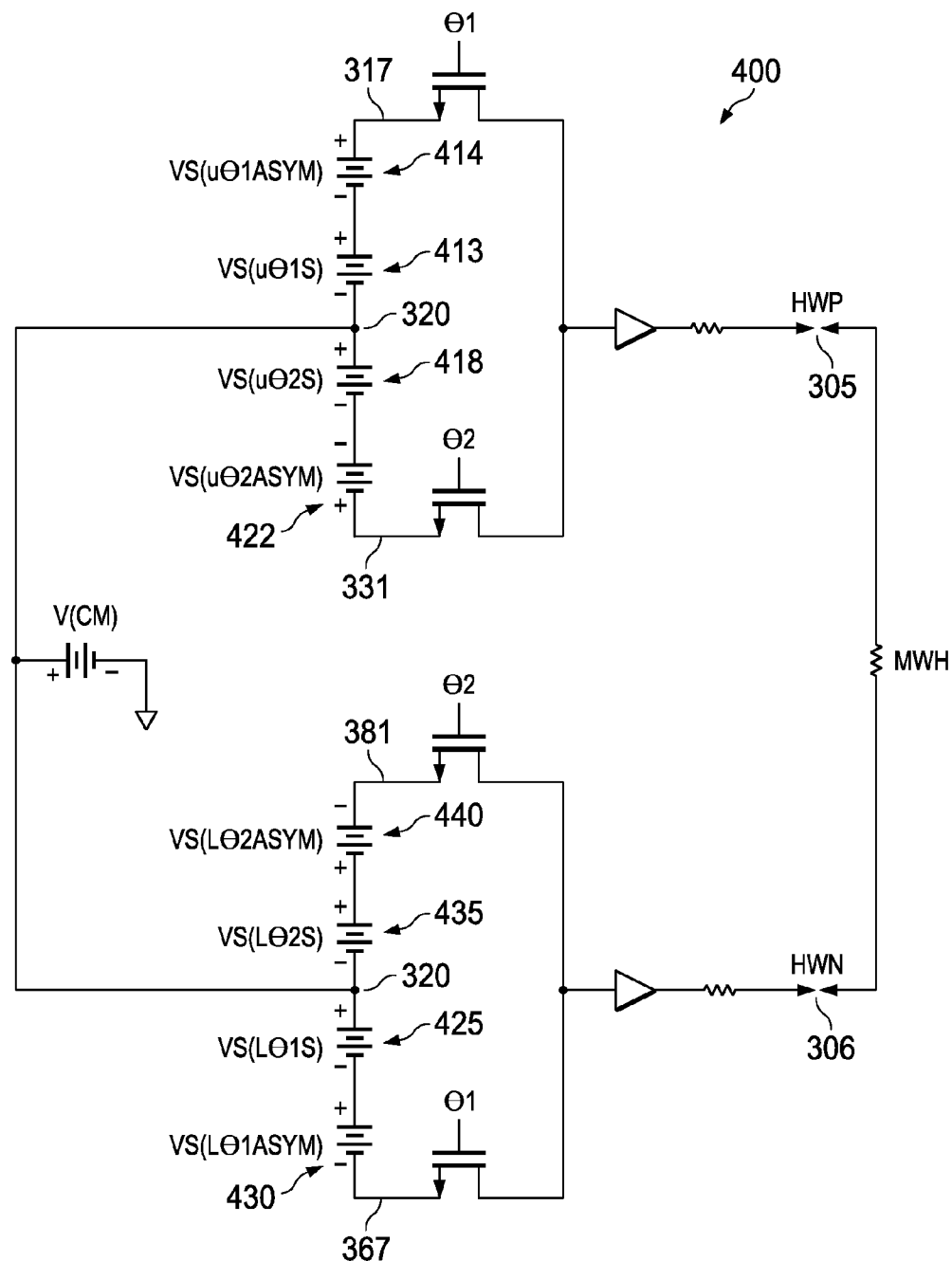
FIG. 4 is a circuit diagram of an HDD magnetic write head differential driver apparatus according to various example embodiments.

FIG. 4 is a circuit diagram of an HDD magnetic write head differential driver apparatus 400 according to various example embodiments. Considering FIGS. 3 and 4 together, the write head driver apparatus 400 is structurally similar to the write head driver apparatus 300 discussed immediately above. Apparatus 400 breaks out each of the apparatus 300 voltage sources from the upper driver section 302 and the lower driver section 304 into two component sources. An asymmetrical component source "VS(section,phase,ASYM)" is additive to a symmetrical component source "VS(section,phase,S)" at θ1 time and is subtractive from VS(section,phase,S) at θ2 time.

Conventions used herein for voltage source polarities and algebraic sums of voltage sources in series are as follows. If the polarities of two sources in series are aligned, the magnitudes are added. The sum is also assigned a polarity sign consistent with the expected polarity at the appropriate phase switch. If the polarities of the two sources in series are opposing, the magnitude of the smaller absolute magnitude voltage source is subtracted from the magnitude of the greater absolute magnitude voltage source to yield a voltage difference. The voltage difference is also assigned a polarity sign consistent with the expected polarity at the appropriate phase switch. In the case of the magnetic write head driver 400, the symmetrical voltage component is greater than the asymmetrical voltage component. The split voltage reference driver apparatus 400 may be useful for positioning the magnitudes of the two switched waveforms at HWP 305 and HWN 306 with respect to the common mode voltage at node 320.

The magnetic write head differential driver apparatus 400 includes the components previously mentioned regarding the driver apparatus 300, with the following considerations. The upper section θ1 voltage source VS(Uθ1) 314 of the driver apparatus 300 may be included in driver apparatus 400 as two component voltage sources, V(Uθ1S) 413 and V(Uθ1ASYM) 414. The upper section θ1 symmetrical component voltage source VS(Uθ1S) 413 generates a reference voltage V(Uθ1S). The upper section θ1 asymmetrical component voltage source VS(Uθ1ASYM) 414 generates a reference voltage V(Uθ1ASYM). In some embodiments, VS(Uθ1S) 413 and VS(Uθ1ASYM) 414 may be coupled in additive series to generate an upper section θ1 reference voltage sum V(Uθ1S)+V(Uθ1ASYM). The upper section θ1 reference voltage sum appears at the upper section θ1 switch input terminal 317.

The upper section θ2 voltage source VS(Uθ2) 330 of the driver apparatus 300 may be included in the driver apparatus 400 as two component voltage sources, V(Uθ2S) 418 and V(Uθ2ASYM) 422. The upper section θ2 symmetrical component voltage source VS(Uθ2S) 418 generates a reference voltage V(Uθ2S). The upper section θ2 asymmetrical component voltage source VS(Uθ2ASYM) 422 generates a reference voltage V(Uθ2ASYM). In some embodiments, VS(Uθ2S) 418 and VS(Uθ2ASYM) 422 may be coupled in subtractive series to generate an upper section θ2 reference voltage difference −[V(Uθ2S)−V(Uθ2ASYM).] The upper section θ2 reference voltage difference is negative with respect to the common mode voltage because V(Uθ2S) is greater than V(Uθ2ASYM) and V(Uθ2S) is polarized negatively with respect to the upper section θ2 switch input terminal 331.

The lower section θ1 voltage source VS(Lθ1) 364 of apparatus 300 may be included in the driver apparatus 400 as two component voltage sources, VS(Lθ1S) 425 and VS(Lθ1ASYM) 430. The lower section θ1 symmetrical component voltage source VS(Lθ1S) 425 generates a reference voltage V(Lθ1S). The lower section θ1 asymmetrical component voltage source VS(Lθ1ASYM) 430 generates a reference voltage V(Lθ1ASYM). In some embodiments, VS(Lθ1S) 425 and VS(Lθ1ASYM) 430 may be coupled in additive series to generate a lower section θ1 reference voltage sum of −[V(Lθ1S)+V(Lθ1ASYM)]. The lower section θ1 reference voltage sum appears at the lower section θ1 switch input terminal 367.

The lower section θ2 voltage source VS(Lθ2) 380 of apparatus 300 may be included in the driver apparatus 400 as two component voltage sources, V(Lθ2S) 435 and V(Lθ2ASYM) 440. The lower section θ2 symmetrical component voltage source VS(Lθ2S) 435 generates a reference voltage V(Lθ2S). The lower section θ2 asymmetrical component voltage source VS(Lθ2ASYM) 440 generates a reference voltage V(Lθ2ASYM). In some embodiments, VS(Lθ2S) 435 and VS(Lθ2ASYM) 440 may be coupled in subtractive series to generate a lower section θ2 reference voltage difference V(Lθ2S)−V(Lθ2ASYM). The lower section θ2 reference voltage difference appears at the lower section θ2 switch input terminal 381.

It is noted that the subject matter associated with HDD magnetic head driver embodiments recited herein is related to the subject matter of Attorney Docket No. TI-72267, filed as application Ser. No. 13/570,429 on Aug. 9, 2012 and incorporated herein by reference in its entirety.

Figure 5:
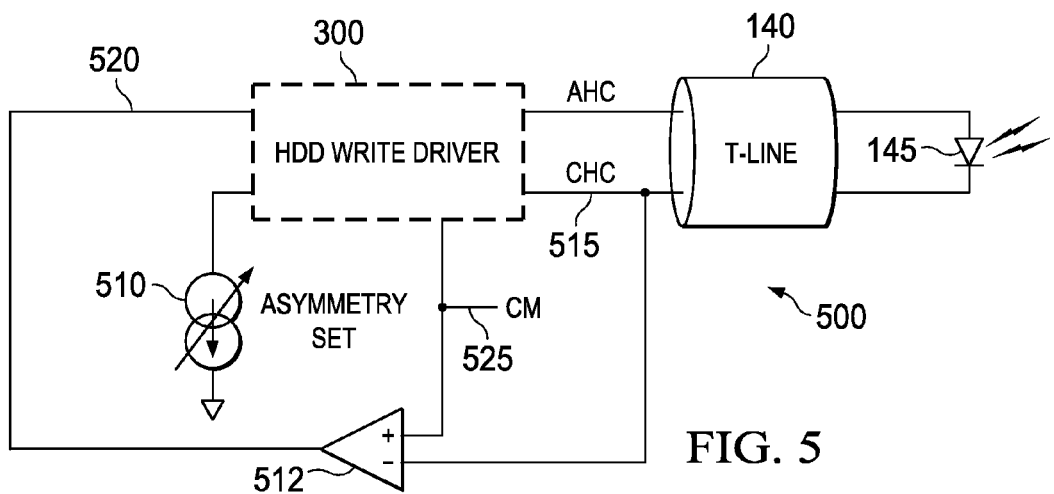
FIG. 5 is a block diagram of a laser diode driver apparatus using HDD write driver core circuitry according to various example embodiments.

FIG. 5 is a block diagram of a laser diode driver apparatus 500 using HDD write driver core circuitry 300 according to various example embodiments. A variable current source "asymmetry set" 510 represents the ability to adjust the relative magnitudes of the asymmetric component of each of the reference voltage sources as described above in the context of the driver apparatus 400.

An operational amplifier 512 is added as a feedback element between the cathode heating current (CHC) output 515 and the anode section common mode node 520 as described in greater detail below. The feedback loop holds the cathode section output CHC 515 at the potential of the cathode section common mode junction 525. The loop also adjusts the potential of the anode section common mode node 520 as necessary to provide current accuracy independent of the electrical characteristics of the selected laser diode 145.

Figure 6:
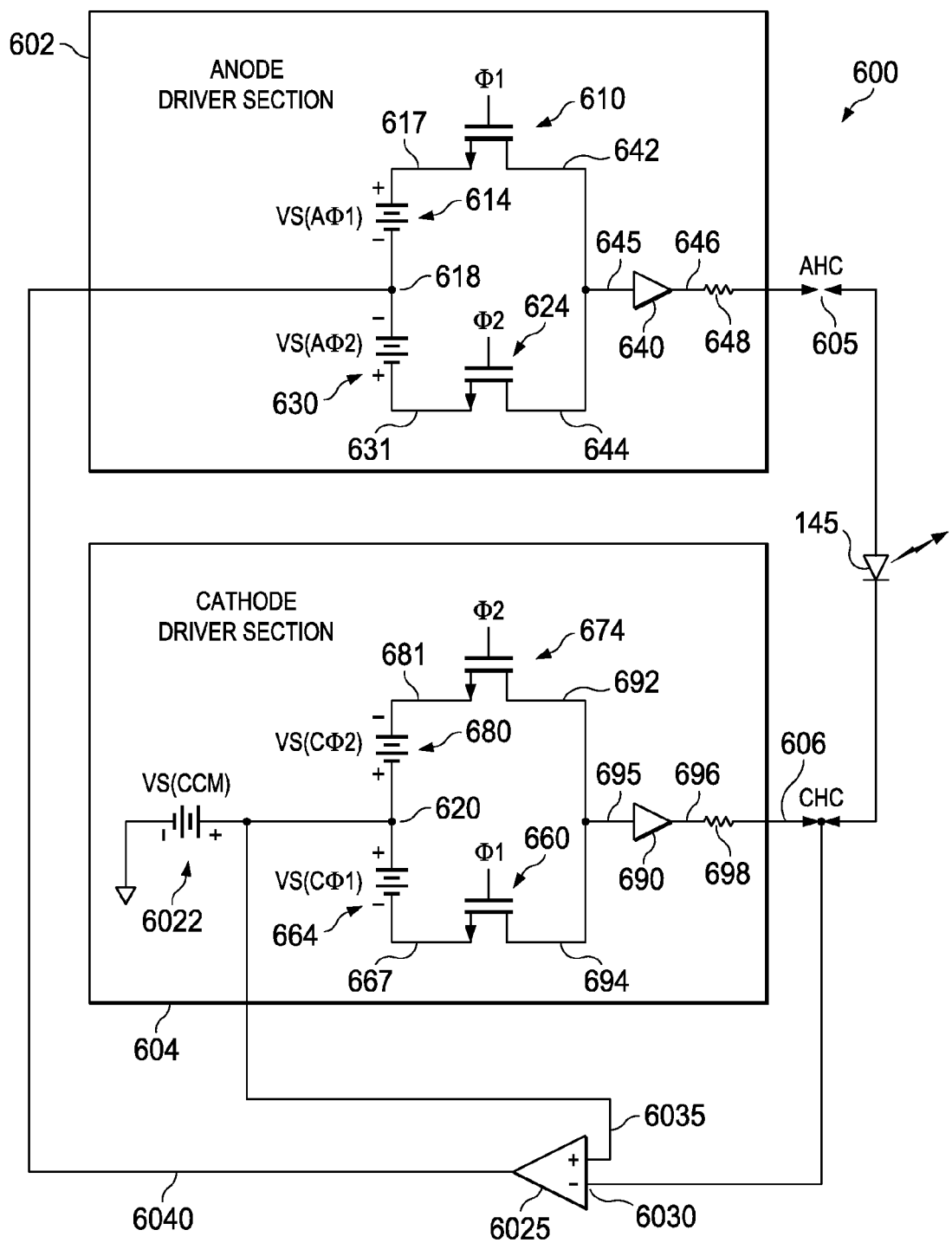
FIG. 6 is a circuit diagram of a laser diode driver apparatus according to various example embodiments.

FIG. 6 is a circuit diagram of a laser diode driver apparatus 600 according to various example embodiments. The driver apparatus 600 includes an anode driver section 602 and a cathode driver section 604. The anode driver section 602 generates a voltage at an output "anode heating current" (AHC) 605. The cathode driver section 304 generates a voltage at an output "cathode heating current" (CHC) 606. The differential voltage across AHC 605 and CHC 606 may be applied to a laser diode 145. The apparatus 600 may be used in some embodiments of a HAMR HDD system, as further described below.

The laser diode driver apparatus 600 includes an anode section θ1 switch 610. The apparatus 600 also includes an anode section Φ1 voltage source VS(AΦ1) 614. The voltage source 614 is coupled between an input 617 of the anode section Φ1 switch 610 and an anode section common mode junction 618 and generates an anode section Φ1 reference voltage V(AΦ1). At a selected switching time referred to hereinafter as "Φ1 switching time," the anode section Φ1 switch 610 transfers reference voltage V(AΦ1) to the output AHC 605 of the anode section 602 of the laser diode driver apparatus 600.

The laser diode driver apparatus 600 further includes an anode section Φ2 switch 624 and an anode section Φ2 voltage source VS(AΦ2) 630. The voltage source 630 is coupled between an input 631 of the anode section Φ2 switch 624 and the anode section common mode junction 618 and generates an anode section Φ2 reference voltage V(AΦ2). At a selected switching time referred to hereinafter as "Φ2 switching time," the anode section Φ2 switch 624 transfers reference voltage V(AΦ2) to the output AHC 605 of the anode section 602 of the laser diode driver apparatus 600.

In order to generate a switched output voltage with voltage states that do not cross over the common mode voltage at the common mode junction 618, reference voltages V(AΦ1) and V(AΦ2) may be of different magnitudes. E.g., V(AΦ1) may be of greater absolute magnitude than V(Φ2), as shown in subsequent examples.

The laser diode driver apparatus 600 may also include an anode section impedance matching buffer 640. The buffer 640 is coupled to an output 642 of the anode section Φ1 switch 610 and to an output 644 of the anode section Φ2 switch 624. The buffer 640 may have unity gain and replicate signals from the buffer input 645 to the buffer output 646. The driver apparatus 600 may also include an anode section impedance matching resistor 648. The resistor 648 is coupled between the output 646 of the anode section impedance matching buffer 640 and the driver output AHC 605.

Turning now to the cathode driver section 604, the apparatus 600 also includes a cathode section Φ1 switch 660. The apparatus 600 further includes a cathode section Φ1 voltage source VS(CΦ1) 664. The voltage source 664 is coupled between an input 667 of the cathode section Φ1 switch 660 and the cathode section common mode junction 620 and generates a cathode section Φ1 reference voltage V(CΦ1). At Φ1 switching time, the cathode section Φ1 switch 660 transfers reference voltage V(CΦ1) to the output CHC 606 of the cathode section 604 of the apparatus 600.

The laser diode driver apparatus 600 also includes a cathode section Φ2 switch 674 and a cathode section Φ2 voltage source VS(CΦ2) 680. The voltage source 680 is coupled between an input 681 of the cathode section Φ2 switch 674 and the cathode section common mode junction 620 and generates a Φ2 reference voltage V(CΦ2). At Φ2 switching time, the cathode section Φ2 switch 674 transfers reference voltage V(CΦ2) to the output CHC 606 of the cathode section 604 of the laser diode driver apparatus 600.

In order to generate a switched output voltage with voltage states that do not cross over the common mode voltage, reference voltages V(CΦ1) and V(CΦ2) may be of different magnitudes. E.g., V(CΦ1) may be of greater absolute magnitude than V(CΦ2), as shown in subsequent examples.

The laser diode driver apparatus 600 may also include a cathode section impedance matching buffer 690. The buffer 690 is coupled to an output 694 of the cathode section Φ1 switch and to an output 692 of the cathode section Φ2 switch. In some embodiments, the buffer 690 may have unity gain and replicate signals from the buffer input 695 to the buffer output 696. The driver apparatus 600 may also include a cathode section impedance matching resistor 698. The resistor 698 is coupled between the output 696 of the cathode section impedance matching buffer 690 and the driver output CHC 606.

In some embodiments, the apparatus 600 may also include a cathode section common mode voltage source VS(CCM) 6022. The cathode section common mode voltage source 6022 is coupled to the cathode section common mode junction 620 to establish a cathode driver output terminal voltage V(CHC) at CHC 606.

The apparatus 600 further includes an operational amplifier 6025 as a feedback element to stabilize driver-supplied laser diode current. The op-amp 6025 is coupled between the cathode driver output terminal CHC 606 and the anode section common mode junction 618. A first input 6030 to the op-amp 6025 is coupled to CHC 606. A second input 6035 to the op-amp 6025 is coupled to the cathode section common mode junction 620. An output 6040 of the op-amp 6025 is coupled to the anode section common mode junction 618 to provide the feedback.

It is noted that in some embodiments the feedback element (e.g., the op-amp 6025) may be positioned to provide feedback from the anode section output AHC 605 to the cathode common mode junction 620. In the latter case, both the common mode voltage source 6022 and the input 6035 of the op-amp 6025 are coupled to the anode common mode junction 618.

Figure 7:
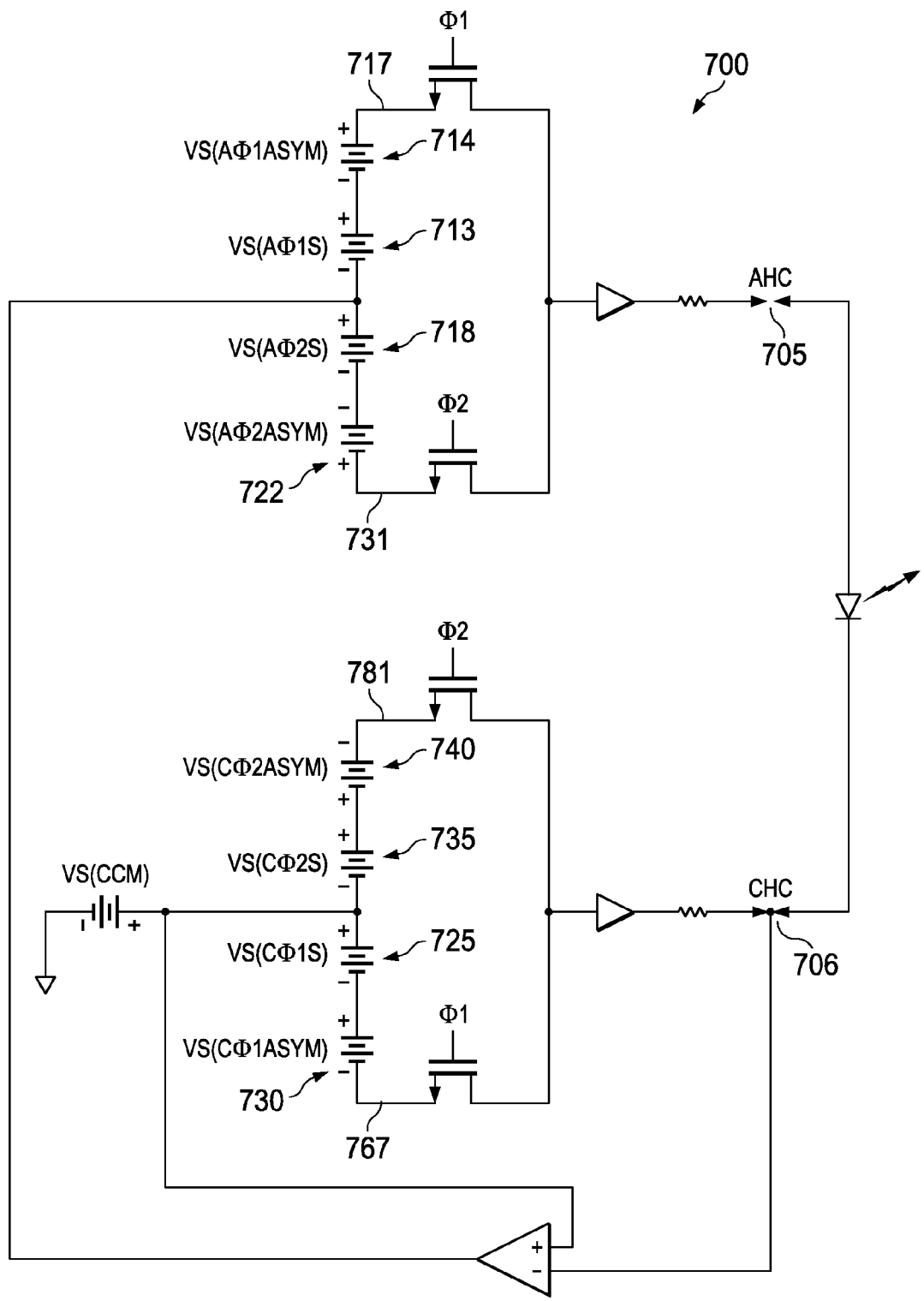
FIG. 7 is a circuit diagram of a laser diode driver apparatus according to various example embodiments.

FIG. 7 is a circuit diagram of a laser diode driver apparatus 700 according to various example embodiments. Considering FIGS. 6 and 7 together, the laser diode driver apparatus 700 is structurally similar to the laser diode driver apparatus 600 discussed immediately above. Apparatus 700 explicitly breaks out each of the apparatus 600 voltage sources from the anode driver section 602 and the cathode driver section 604 into two component sources. An asymmetrical component source "VS(section,phase,ASYM)" is additive to a symmetrical component source "VS(section,phase,S)" at Φ1 time and is subtractive from VS(section,phase,S) at Φ2 time.

This split voltage reference driver apparatus 700 may be useful for positioning the magnitudes of the two switched waveforms at AHC 705 and CHC 706 with respect to the common mode voltage.

The laser diode driver apparatus 700 includes the components previously mentioned regarding the driver apparatus 600, with the following considerations. The anode section Φ1 voltage source VS(AΦ1) 614 of the driver apparatus 600 may be included in the driver apparatus 700 as the two component voltage sources V(AΦ1S) 713 and V(AΦ1ASYM) 714. The anode section Φ1 symmetrical component voltage source VS(AΦ1S) 713 generates a reference voltage V(AΦ1S). The anode section Φ1 asymmetrical component voltage source VS(AΦ1ASYM) 714 generates a reference voltage V(AΦ1ASYM). In some embodiments, VS(AΦ1S) 713 and VS(AΦ1ASYM) 714 may be coupled in additive series to generate an anode section Φ1 reference voltage sum V(AΦ1S)+V(AΦ1ASYM). The anode section Φ1 reference voltage sum appears at the anode section Φ1 switch input terminal 717.

The anode section Φ2 voltage source VS(AΦ2) 630 of the driver apparatus 600 may be included in the driver apparatus 700 as two component voltage sources, V(AΦ2S) 718 and V(AΦ2ASYM) 722. The anode section Φ2 symmetrical component voltage source VS(AΦ2S) 718 generates a reference voltage V(AΦ2S). The anode section Φ2 asymmetrical component voltage source VS(AΦ2ASYM) 722 generates a reference voltage V(AΦ2ASYM). V(AΦ2ASYM) may be greater than V(AΦ2S) in some embodiments in order to prevent polarity reversal and thus reversal of current direction between the anode driver section output AHC 705 and the lower driver section output CHC 706. In some embodiments, VS(AΦ2S) 718 and VS(AΦ2ASYM) 722 may be coupled in subtractive series to generate an anode section Φ2 reference voltage difference V(AΦ2ASYM)–V(AΦ2S). The anode section Φ2 reference voltage difference is positive with respect to the common mode for the apparatus 700 because the asymmetrical component V(AΦ2ASYM) is greater than the symmetrical component V(AΦ2S). The anode section Φ2 reference voltage difference appears at the anode section Φ2 switch input terminal 731.

The cathode section Φ1 voltage source VS(CΦ1) 664 of apparatus 600 may be included in the driver apparatus 700 as two component voltage sources, VS(CΦ1S) 725 and VS(CΦ1ASYM) 730. The cathode section Φ1 symmetrical component voltage source VS(CΦ1S) 725 generates a reference voltage V(CΦ1S). The cathode section Φ1 asymmetrical component voltage source VS(CΦ1ASYM) 730 generates a reference voltage V(CΦ1ASYM). In some embodiments, VS(CΦ1S) 725 and VS(CΦ1ASYM) 730 may be coupled in additive series to generate a cathode section Φ1 reference voltage sum of –[V(CΦ1S)+V(CΦ1ASYM)]. The cathode section Φ1 reference voltage sum is negative with respect to the common mode for the apparatus 700. The asymmetrical component V(AΦ2ASYM) is greater than the symmetrical component V(AΦ2S) and is polarized negatively with respect to the cathode section Φ1 switch input terminal 767. appears at the cathode section Φ1 switch input terminal 767.

The cathode section Φ2 voltage source VS(CΦ2) 680 of apparatus 600 may be included in the driver apparatus 700 as two component voltage sources, V(CΦ2S) 735 and V(CΦ2ASYM) 740. The cathode section Φ2 symmetrical component voltage source VS(CΦ2S) 735 generates a reference voltage V(CΦ2S). The cathode section Φ2 asymmetrical component voltage source VS(CΦ2ASYM) 740 generates a reference voltage V(CΦ2ASYM). V(CΦ2ASYM) may be greater than V(CΦ2S) in some embodiments in order to prevent polarity reversal and thus reversal of current direction between the anode driver section output AHC 705 and the cathode driver section output CHC 706. In some embodiments, VS(CΦ2S) 735 and VS(CΦ2ASYM) 740 may be coupled in subtractive series to generate a cathode section Φ2 reference voltage difference –[V(CΦ2ASYM–V(CΦ2S)]. The cathode section Φ2 reference voltage difference is negative with respect to the common mode for the apparatus 700. The asymmetrical component V(AΦ2ASYM) is greater than the symmetrical component V(AΦ2S) and is polarized negatively with respect to the cathode section Φ2 switch input terminal 781.

Figure 8:
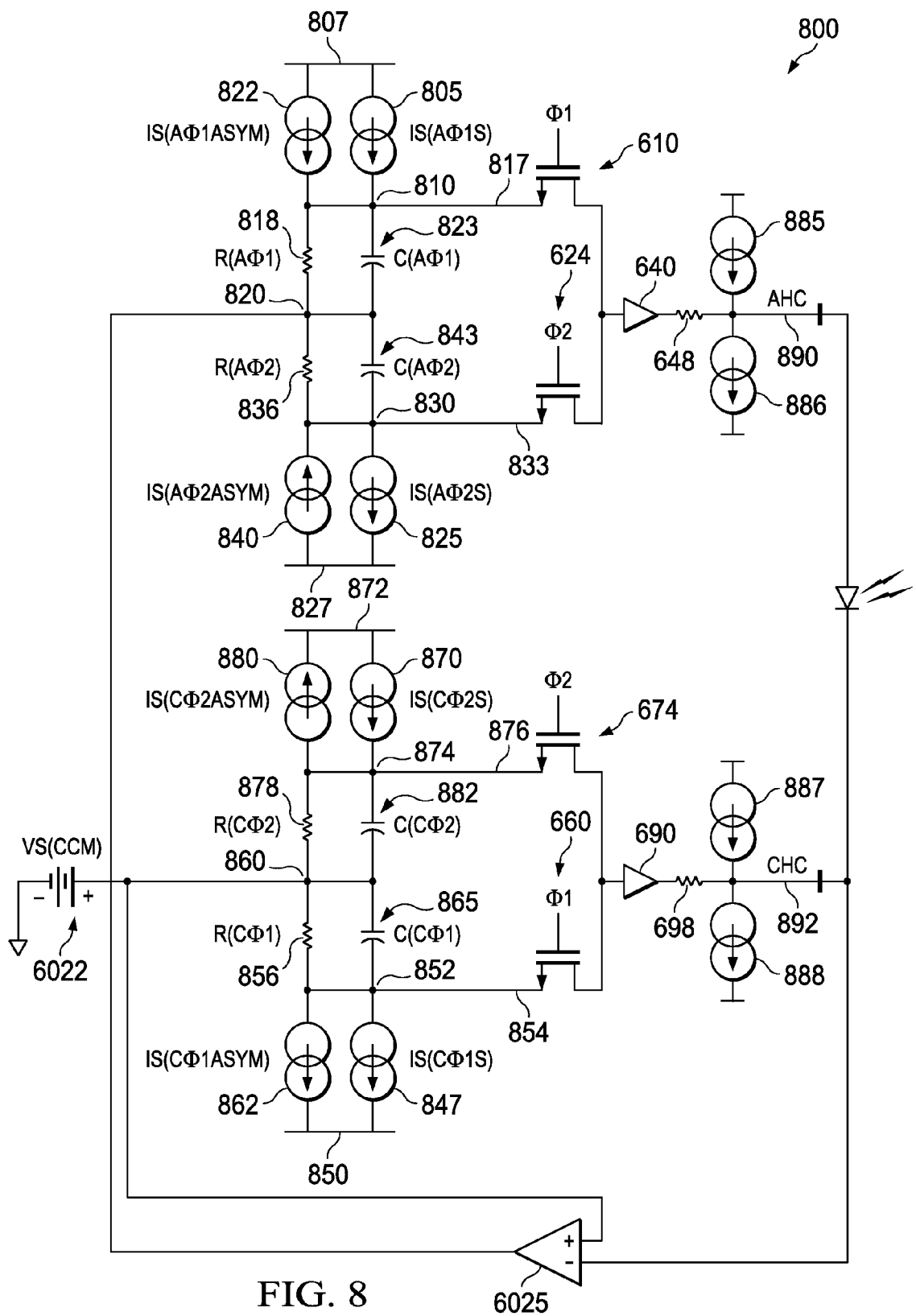
FIG. 8 is a circuit diagram of a laser diode driver apparatus according to various example embodiments.

FIG. 8 is a circuit diagram of a laser diode driver apparatus 800 according to various example embodiments. In some embodiments, it may be desirable to implement the laser diode driver circuit using reference currents and resistors rather than reference voltage sources. Considering FIGS. 7 and 8 together, the laser diode driver apparatus 800 is structurally similar to the laser diode driver apparatus 700 discussed immediately above. Apparatus 800 represents each reference voltage source of driver apparatus 700 with one or more reference current sources to provide current flow through one or more reference resistors.

The apparatus 800 includes an anode section Φ1 symmetrical reference current source IS(AΦ1S) 805 in place of the anode section Φ1 voltage source VS(AΦ1S) 713 of FIG. 7. The current source 805 is coupled between a higher-potential voltage rail 807 and a node 810 common to the anode section Φ1 switch input 817. The current source 805 supplies an anode section Φ1 symmetrical component reference current I(AΦ1S). The apparatus 800 also includes an anode section Φ1 reference resistor R(AΦ1) 818. The reference resistor 818 is coupled to the node 810 common to the anode section Φ1 switch input 817 and is in series between IS(AΦ1S) 805 and the anode section common mode terminal 820. R(AΦ1) 818 conducts I(AΦ1S) to develop a reference voltage component V(AΦ1S) equal to R(AΦ1)*I(AΦ1S).

The apparatus 800 also includes an anode section Φ1 asymmetrical component current source IS(AΦ1ASYM) 822 in place of the voltage source VS(AΦ1ASYM) 714 of apparatus 700. Current source IS(AΦ1ASYM) 822 is coupled between the higher-potential voltage rail 807 and the node 810 common to the anode section Φ1 switch input 817. IS(AΦ1ASYM) 822 supplies an anode section Φ1 asymmetrical component reference current I(AΦ1ASYM). The reference resistor R(AΦ1) 818 conducts I(AΦ1ASYM) and develops a reference voltage component V(AΦ1ASYM) equal to R(AΦ1)*I(AΦ1ASYM). The apparatus 800 further includes a capacitor C(AΦ1) 823 in parallel with R(AΦ1) 818. C(AΦ1) 823 and R(AΦ1) 818 form a low-pass filter to stabilize the reference voltage V(AΦ1). V(AΦ1) is the total voltage drop across R(AΦ1) 818 due to the net current flow:

V(AΦ1)=[I(AΦ1S)+I(AΦ1ASYM)]*R(AΦ1).

The apparatus 800 includes an anode section Φ2 symmetrical reference current source IS(AΦ2S) 825 in place of the anode section Φ2 voltage source VS(AΦ2S) 722 of FIG. 7. The current source 825 is coupled between a lower-potential voltage rail 827 and a node 830 common to an anode section Φ2 switch input 833. The current source 825 supplies an anode section Φ2 symmetrical component reference current I(AΦ2S). The apparatus 800 also includes an anode section Φ2 reference resistor R(AΦ2) 836. The reference resistor 836 is coupled to the node 830 common to the anode section Φ2 switch input 833 and is in series between IS(AΦ2S) 825 and the anode section common mode terminal 820. R(AΦ2) 836 conducts I(AΦ2S) to develop a reference voltage component V(AΦ2S) equal to R(AΦ2)*I(AΦ2S).

The apparatus 800 also includes an anode section Φ2 asymmetrical component current source IS(AΦ2ASYM) 840 in place of the voltage source VS(AΦ2ASYM) 722 of apparatus 700. Current source IS(AΦ1ASYM) 840 is coupled between the lower-potential voltage rail 827 and the node 830 common to the anode section Φ2 switch input 833. IS(AΦ2ASYM) 840 supplies an anode section Φ2 asymmetrical component reference current I(AΦ2ASYM). The reference resistor R(AΦ2) 836 conducts I(AΦ2ASYM) and develops a reference voltage component V(AΦ2ASYM) equal to R(AΦ2)*I(AΦ2ASYM). The apparatus 800 further includes a capacitor C(AΦ2) 843 in parallel with R(AΦ2) 836. C(AΦ2) 843 and R(AΦ2) 836 form a low-pass filter to stabilize the reference voltage V(AΦ2). V(AΦ2) is the total voltage drop across R(AΦ2) 836 due to the net current flow:

V(AΦ2)=[I(AΦ2ASYM)−I(AΦ2S)]*R(AΦ2).

The apparatus 800 includes a cathode section Φ1 symmetrical reference current source IS(CΦ1S) 847 in place of the cathode section Φ1 voltage source VS(CΦ1S) 725 of FIG. 7. The current source 847 is coupled between a lower-potential voltage rail 850 and a node 852 common to the a cathode section Φ1 switch input 854. The current source 847 supplies a cathode section Φ1 symmetrical component reference current I(CΦ1S). The apparatus 800 also includes a cathode section Φ1 reference resistor R(CΦ1) 856. The reference resistor 856 is coupled to the node 852 common to the cathode section Φ1 switch input 854 and is in series between IS(CΦ1S) 847 and a cathode section common mode terminal 860. R(CΦ1) 856 conducts I(CΦ1S) to develop a reference voltage component V(CΦ1S) equal to R(CΦ1)*I(CΦ1S).

The apparatus 800 also includes a cathode section Φ1 asymmetrical component current source IS(CΦ1ASYM) 862 in place of the voltage source VS(CΦ1ASYM) 730 of apparatus 700. Current source IS(CΦ1ASYM) 862 is coupled between the lower-potential voltage rail 850 and the node 852 common to the cathode section Φ1 switch input 854. IS(CΦ1ASYM) 862 supplies a cathode section Φ1 asymmetrical component reference current I(CΦ1ASYM). The reference resistor R(CΦ1) 856 conducts I(CΦ1ASYM) and develops a reference voltage component V(CΦ1ASYM) equal to R(CΦ1)*I(CΦ1ASYM). The apparatus 800 further includes a capacitor C(CΦ1) 865 in parallel with R(CΦ1) 856. C(CΦ1) 865 and R(CΦ1) 856 form a low-pass filter to stabilize the reference voltage V(CΦ1). V(CΦ1) is the total voltage drop across R(CΦ1) 856 due to the net current flow:

V(CΦ1)=−[I(CΦ1S)+I(CΦ1ASYM)]*R(CΦ1)

The apparatus 800 includes a cathode section Φ2 symmetrical reference current source IS(CΦ2S) 870 in place of the cathode section Φ2 voltage source VS(CΦ2S) 735 of FIG. 7. The current source 870 is coupled between a higher-potential voltage rail 872 and a node 874 common to a cathode section Φ2 switch input 876. The current source 870 supplies a cathode section Φ2 symmetrical component reference current I(CΦ2S). The apparatus 800 also includes a cathode section Φ2 reference resistor R(CΦ2) 878. The reference resistor 878 is coupled to the node 874 common to the cathode section Φ2 switch input 876 and is in series between IS(CΦ2S) 870 and the cathode section common mode terminal 860. R(CΦ2) 878 conducts I(CΦ2S) to develop a reference voltage component V(CΦ2S) equal to R(CΦ2)*I(CΦ2S).

The apparatus 800 also includes a cathode section Φ2 asymmetrical component current source IS(CΦ2ASYM) 880 in place of the voltage source VS(CΦ2ASYM) 740 of apparatus 700. Current source IS(CΦ2ASYM) 880 is coupled between the higher-potential voltage rail 872 and the node 874 common to the cathode section Φ2 switch input 876. IS(CΦ2ASYM) 880 supplies a cathode section Φ2 asymmetrical component reference current I(CΦ2ASYM). The reference resistor R(CΦ2) 878 conducts I(CΦ2ASYM) and develops a reference voltage component V(CΦ2ASYM) equal to R(CΦ2)*I(CΦ2ASYM). The apparatus 800 further includes a capacitor C(CΦ2) 882 in parallel with R(CΦ2) 878. C(CΦ2) 882 and R(CΦ2) 878 form a low-pass filter to stabilize the reference voltage V(CΦ2). V(CΦ2) is the total voltage drop across R(CΦ2) 878 due to the net current flow:

V(CΦ2)=−[I(CΦ2ASYM)−I(CΦ2S)]*R(CΦ2)

The laser diode driver apparatus 800 further includes overshoot current sources 885 and 886 coupled to an AHC output 890 and overshoot current sources 887 and 888 coupled to a CHC output 892. The overshoot current sources 885, 886, 887, and 888 produce overshoot in the switched current waveform at both rising edge and falling edge current switching transitions.

The driver apparatus 800 also includes switches 610, 624, 674, and 660; buffers 640, 690; resistors 648, 698; cathode common mode voltage source 6022; and op-amp 6025 as previously described for the laser diode driver apparatus 600 of FIG. 6.

Figure 9:
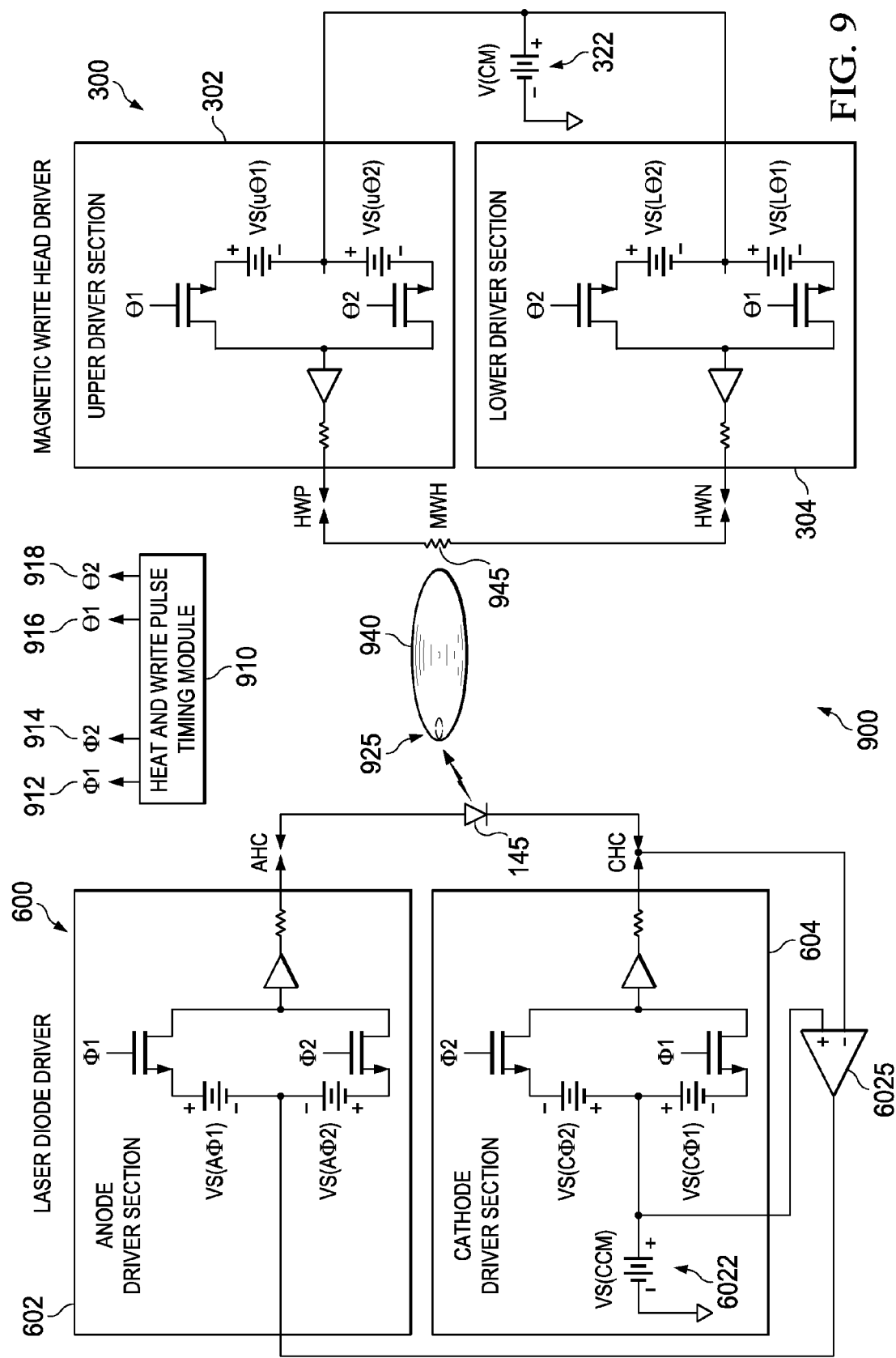
FIG. 9 is a circuit diagram of a HAMR system according to various example embodiments.

FIG. 9 is a circuit diagram of a HAMR system 900 according to various example embodiments. The HAMR system 900 includes a magnetic write head driver 300 and a laser diode driver 600 as previously described in conjunction with FIGS. 3 and 6, respectively. The magnetic write head driver 300 includes an upper driver section 302, a lower driver section 304, and a common mode voltage source 322. The laser diode driver 600 includes an upper driver section 602, cathode driver section 604, cathode common mode voltage source 6022, and op-amp 6025, all as previously described.

The HAMR system 900 also includes a heat and write pulse timing module 910. The heat and write pulse timing module 910 is coupled via outputs Φ1 912 and Φ2 914 to the laser diode driver Φ1 and Φ2 switches. The module 910 is also coupled via outputs θ1 916 and θ2 918 to the magnetic write head driver θ1 and θ2 switches.

The heat and write pulse timing module 910 determines whether the laser diode driver is in a Φ1 state or a Φ2 state. The module 910 also determines whether the magnetic write head driver is in a θ1 state or a θ2 state. In the Φ1 state, the laser diode driver 600 passes sufficient current through the laser diode 145 to heat a surface 925 of a magnetic medium 940 to be subsequently written by the write head driver 300. In the θ1 state, the magnetic write head driver passes sufficient current through the magnetic write head 945 to effect recording on the heated medium surface 925.

Apparatus described herein may be useful in applications other than HAMR-based data storage. Examples of the HAMR driver apparatus and systems 300, 400, 500, 600, 700, 800, and 900 are intended to provide a general understanding of the structures of various embodiments. They are not intended to serve as complete descriptions of all elements and features of apparatus and systems that might make use of these structures.

The various embodiments may be incorporated into semiconductor analog and digital circuits for use in receptacle power converters, electronic circuitry used in computers, communication and signal processing circuitry, single-processor or multi- processor modules, single or multiple embedded processors, multi-core processors, data switches, and application-specific modules including multi-layer, multi-chip modules, among others. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

Apparatus and systems disclosed herein create differential drive signals suitable for HAMR data recording. A laser diode differential driver provides heating current pulses at time Φ1. The pulses energize a laser diode to pre-heat the magnetic medium to be written. Some embodiments duplicate portions of circuit architecture used in a magnetic write head differential driver to create the laser diode differential driver. The write head driver provides write current pulses to a magnetic write head at θ1 time and write pulses in the opposite direction at θ2 time.

Both drivers utilize sets of reference voltages capable of being switched to one terminal or the other of the element to be driven, whether laser diode or magnetic write head. In the laser diode case, the common mode is split between the anode and cathode sections of the driver. A feedback element is added between the cathode section output and the anode section common mode junction to provide current accuracy independent of the electrical characteristics of the selected laser diode. Driving both the laser diode localized heating mechanism and the magnetic write head using similar driver circuitry helps to maintain tracking between the two apparatus across temperature, process, and bias current variables.

By way of illustration and not of limitation, the accompanying figures show specific aspects in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The aspects illustrated are described in sufficient detail to enable those skilled in the art to practice the teachings disclosed herein. Other aspects may be used and derived therefrom, such that structural and logical substitutions and changes may be made without departing from the scope of this disclosure. This Detailed Description, therefore, is not to be taken in a limiting sense. The breadth of various aspects is defined by the appended claims and the full range of equivalents to which such claims are entitled.

Such aspects of the inventive subject matter may be referred to herein individually or collectively by the term "invention" merely for convenience and without intending to voluntarily limit this application to any single invention or inventive concept, if more than one is in fact disclosed. Thus, although specific aspects have been illustrated and described herein, any arrangement calculated to achieve the same purpose may be substituted for the specific aspects shown. This disclosure is intended to cover any and all adaptations or variations of various aspects.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A laser diode driver apparatus, comprising:
   an anode section Φ1 switch to transfer an anode section Φ1 reference voltage V(AΦ1) to an output AHC of an anode section of the driver apparatus at a Φ1 switching time;
   an anode section Φ1 voltage source VS(AΦ1) coupled between an input of the anode section Φ1 switch and an anode section common mode junction to generate V(AΦ1);
   an anode section Φ2 switch to transfer a Φ2 reference voltage V(AΦ2) to the output AHC of the anode section portion of the driver apparatus at a Φ2 switching time;
   an anode section Φ2 voltage source VS(AΦ2) coupled between an input of the anode section Φ2 switch and the anode section common mode junction to generate V(AΦ2), V(AΦ1) of greater absolute magnitude than V(AΦ2);
   an anode section impedance matching buffer coupled to an output of the anode section Φ1 switch and to an output of the anode section Φ2 switch;
   an anode section impedance matching resistor coupled between an output of the anode section impedance matching buffer and the output AHC;
   a cathode section Φ1 switch to transfer a cathode section Φ1 reference voltage V(CΦ1) to an output CHC of a cathode section of the driver apparatus at a Φ1 switching time;
   a cathode section Φ1 voltage source VS(CΦ1) coupled between an input of the cathode section Φ1 switch and a cathode section common mode junction to generate V(CΦ1);
   a cathode section Φ2 switch to transfer a Φ2 reference voltage V(CΦ2) to the output CHC of the cathode section of the driver apparatus at a Φ2 switching time;
   a cathode section Φ2 voltage source VS(CΦ2) coupled between an input of the cathode section Φ2 switch and the cathode section common mode junction to generate V(CΦ2), V(CΦ1) of greater absolute magnitude than V(CΦ2);

a cathode section impedance matching buffer coupled to an output of the cathode section Φ1 switch and to an output of the cathode section Φ2 switch;

a cathode section impedance matching resistor coupled between an output of the cathode section impedance matching buffer and the output CHC;

a cathode section common mode voltage source VS(CCM) coupled to the cathode section common mode junction to establish a cathode driver output terminal voltage V(CHC); and an operational amplifier coupled as a feedback element between the cathode driver output terminal CHC and the anode section common mode junction, a first input to the operational amplifier coupled to CHC, a second input to the operational amplifier coupled to the cathode section common mode junction, and an output of the operational amplifier coupled to the anode section common mode junction, feedback to the anode section common mode junction to stabilize driver-supplied laser diode current.

2. The laser diode driver apparatus of claim 1, the anode section Φ1 voltage source VS(AΦ1) further comprising:

an anode section Φ1 symmetrical component voltage source VS(AΦ1S) to generate a reference voltage V(AΦ1S); and an anode section Φ1 asymmetrical component voltage source VS(AΦ1ASYM) to generate a reference voltage V(AΦ1ASYM) greater than V(AΦ1S), VS(AΦ1S) and VS(AΦ1ASYM) coupled in additive series to generate an anode section Φ1 reference voltage sum V(AΦ1S)+V(AΦ1ASYM) the anode section Φ1 reference voltage sum to appear at the anode section Φ1 switch input terminal.

3. The laser driver apparatus of claim 2, VS(AΦ1S) further comprising:

an anode section Φ1 symmetrical component current source IS(AΦ1S) coupled between a higher-potential voltage rail and a node common to the anode section Φ1 switch input to supply an anode section Φ1 symmetrical component reference current I(AΦ1S); and an anode section Φ1 reference resistor R(AΦ1) coupled to the node common to the anode section Φ1 switch input and in series between IS(AΦ1S) and the anode section common mode terminal to conduct I(AΦ1S) and to develop V(AΦ1S) as R(AΦ1)*I(AΦ1S).

4. The laser driver apparatus of claim 3, VS(AΦ1ASYM) further comprising:

an anode section Φ1 asymmetrical component current source IS(AΦ1ASYM) coupled between the higher-potential voltage rail and the node common to the anode section Φ1 switch input to supply an anode section Φ1 asymmetrical component reference current I(AΦ1ASYM), the reference resistor R(AΦ1) to conduct I(AΦ1ASYM) and to develop V(AΦ1ASYM) as R(AΦ1)*I(AΦ1ASYM); and a capacitor C(AΦ1) in parallel with R(AΦ1) to form a low-pass filter to stabilize the reference voltage V(AΦ1).

5. The laser diode driver apparatus of claim 1, the anode section Φ2 voltage source VS(AΦ2) further comprising:

an anode section Φ2 symmetrical component voltage source VS(AΦ2S) to generate a reference voltage V(AΦ2S); and an anode section Φ2 asymmetrical component voltage source VS(AΦ2ASYM) to generate a reference voltage V(AΦ2ASYM) greater than V(AΦ2S), VS(AΦ2S) and VS(AΦ2ASYM) coupled in subtractive series to generate an anode section Φ2 reference voltage difference V(AΦ2ASYM)−V(AΦ2S), the anode section Φ2 reference voltage difference to appear at the anode section Φ2 switch input terminal.

6. The laser driver apparatus of claim 5, VS(AΦ2S) further comprising:

an anode section Φ2 symmetrical component current source IS(AΦ2S) coupled between a lower-potential voltage rail and a node common to the anode section Φ2 switch input to supply an anode section Φ2 symmetrical component reference current I(AΦ2S); and an anode section Φ2 reference resistor R(AΦ2) coupled to the node common to the anode section Φ2 switch input and in series between IS(AΦ2S) and the anode section common mode terminal to conduct I(AΦ2S) and to develop V(AΦ2S) as R(AΦ2)*I(AΦ2S).

7. The laser driver apparatus of claim 6, VS(AΦ2ASYM) further comprising:

an anode section Φ2 asymmetrical component current source IS(AΦ2ASYM) coupled between the lower-potential voltage rail and the node common to the anode section Φ2 switch input to supply an anode section Φ2 asymmetrical component reference current I(AΦ2ASYM), the reference resistor R(AΦ2) to conduct I(AΦ2ASYM) and to develop V(AΦ2ASYM) as R(AΦ2)*I(AΦ2ASYM); and a capacitor C(AΦ2) in parallel with R(AΦ2) to form a low-pass filter to stabilize the reference voltage V(AΦ2).

8. The laser diode driver apparatus of claim 1, the cathode section Φ1 voltage source VS(CΦ1) further comprising:

a cathode section Φ1 symmetrical component voltage source VS(CΦ1S) to generate reference voltage V(CΦ1S); and a cathode section Φ1 asymmetrical component voltage source VS(CΦ1ASYM) to generate reference voltage V(CΦ1ASYM) greater than V(CΦ1S), VS(CΦ1S) and VS(CΦ1ASYM) coupled in additive series to generate a cathode section Φ1 reference voltage sum −[V(CΦ1S)+V(CΦ1ASYM)], the cathode section Φ1 reference voltage sum to appear at the cathode section Φ1 switch input terminal.

9. The laser driver apparatus of claim 8, VS(CΦ1S) further comprising:

a cathode section Φ1 symmetrical component current source IS(CΦ1S) coupled between a lower-potential voltage rail and a node common to the cathode section Φ1 switch input to supply a cathode section Φ1 symmetrical component reference current I(CΦ1S); and a cathode section Φ1 reference resistor R(CΦ1) coupled to the node common to the cathode section Φ1 switch input and in series between IS(CΦ1S) and the cathode section common mode terminal to conduct I(CΦ1S) and to develop V(CΦ1S) as R(CΦ1)*I(CΦ1S).

10. The laser driver apparatus of claim 9, VS(CΦ1ASYM) further comprising:

a cathode section Φ1 asymmetrical component current source IS(CΦ1ASYM) coupled between the lower-potential voltage rail and the node common to the cathode section Φ1 switch input to supply a cathode section Φ1 asymmetrical component reference current I(CΦ1ASYM), the reference resistor R(CΦ1) to conduct I(CΦ1ASYM) and to develop V(CΦ1ASYM) as R(CΦ1)*I(CΦ1ASYM); and a capacitor C(CΦ1) in parallel with R(CΦ1) to form a low-pass filter to stabilize the reference voltage V(CΦ1).

11. The laser diode driver apparatus of claim 1, the cathode section Φ2 voltage source VS(CΦ2) further comprising:
a cathode section Φ2 symmetrical component voltage source VS(CΦ2S) to generate a reference voltage V(CΦ2S); and
a cathode section Φ2 asymmetrical component voltage source VS(CΦ2ASYM) to generate a reference voltage V(CΦ2ASYM) greater than V(CΦ2S), VS(CΦ2S) and VS(CΦ2ASYM) coupled in subtractive series to generate a cathode section Φ2 reference voltage difference −[V(CΦ2ASYM)−V(CΦ2S)], the cathode section Φ2 reference voltage difference to appear at the cathode section Φ2 switch input terminal.

12. The laser driver apparatus of claim 11, VS(CΦ2S) further comprising:
a cathode section Φ2 symmetrical component current source IS(CΦ2S) coupled between a higher-potential voltage rail and a node common to the cathode section Φ2 switch input to supply a cathode section Φ2 symmetrical component reference current I(CΦ2S); and
a cathode section Φ2 reference resistor R(CΦ2) coupled to the node common to the cathode section Φ2 switch input and in series between IS(CΦ2S) and the cathode section common mode terminal to conduct I(CΦ2S) and to develop V(CΦ2S) as R(CΦ2)*I(CΦ2S).

13. The laser driver apparatus of claim 12, VS(CΦ2ASYM) further comprising:
a cathode section Φ2 asymmetrical component current source IS(CΦ2ASYM) coupled between the higher-potential voltage rail and the node common to the cathode section Φ2 switch input to supply a cathode section Φ2 asymmetrical component reference current I(CΦ2ASYM), the reference resistor R(CΦ2) to conduct I(CΦ2ASYM) and to develop V(CΦ2ASYM) as R(CΦ2)*I(CΦ2ASYM); and
a capacitor C(CΦ2) in parallel with R(CΦ2) to form a low-pass filter to stabilize the reference voltage V(CΦ2).

14. A Heat Assisted Magnetic Recording (HAMR) driver system, comprising:
a magnetic write head differential driver, comprising:
an upper section θ1 switch to transfer an upper section θ1 reference voltage V(Uθ1) to an output HWP of a source portion of the write driver apparatus at a θ1 switching time;
an upper section θ1 voltage source VS(Uθ1) coupled between an input of the upper section θ1 switch and an upper section common mode junction to generate V(Uθ1);
an upper section θ2 switch to transfer a θ2 reference voltage V(Uθ2) to the output HWP of the upper section portion of the write driver apparatus at a θ2 switching time;
an upper section θ2 voltage source VS(Uθ2) coupled between an input of the upper section θ2 switch and the upper section common mode junction to generate V(Uθ12), V(Uθ1) of greater absolute magnitude than V(Uθ2);
an upper section impedance matching buffer coupled to an output of the upper section θ1 switch and to an output of the upper section θ2 switch; an upper section impedance matching resistor coupled between an output of the upper section impedance matching buffer and the output HWP;

a lower section θ1 switch to transfer a lower section θ1 reference voltage V(Lθ1) to an output HWN of a lower section of the write driver apparatus at a θ1 switching time;
a lower section θ1 voltage source VS(Lθ1) coupled between an input of the lower section θ1 switch and a lower section common mode junction to generate V(Lθ1);
a lower section θ2 switch to transfer a θ2 reference voltage V(Lθ2) to the output HWN of the lower section of the write driver apparatus at a θ2 switching time;
a lower section θ2 voltage source VS(Lθ2) coupled between an input of the lower section θ2 switch and the lower section common mode junction to generate V(Lθ2), V(Lθ1) of greater absolute magnitude than V(Lθ2);
a lower section impedance matching buffer coupled to an output of the lower section θ1 switch and to an output of the lower section θ2 switch;
a lower section impedance matching resistor coupled between an output of the lower section impedance matching buffer and the output HWN;
a common mode voltage source VS(CM) coupled to the upper and lower section common mode junctions to establish a common mode voltage; and
a laser diode heater driver, comprising:
an anode section Φ1 switch to transfer an anode section Φ1 reference voltage V(AΦ1) to an output AHC of an anode section of the driver apparatus at a Φ1 switching time;
an anode section Φ1 voltage source VS(AΦ1) coupled between an input of the anode section Φ1 switch and an anode section common mode junction to generate V(AΦ1);
an anode section Φ2 switch to transfer a Φ2 reference voltage V(AΦ2) to the output AHC of the anode section of the driver apparatus at a Φ2 switching time;
an anode section Φ2 voltage source VS(AΦ2) coupled between an input of the anode section Φ2 switch and the anode section common mode junction to generate V(AΦ2);
an anode section impedance matching buffer coupled to an output of the anode section Φ1 switch and to an output of the anode section Φ2 switch;
an anode section impedance matching resistor coupled between an output of the anode section impedance matching buffer and the output AHC;
a cathode section Φ1 switch to transfer a cathode section Φ1 reference voltage V(CΦ1) to an output CHC of a cathode section portion of the driver apparatus at a Φ1 switching time;
a cathode section Φ1 voltage source VS(CΦ1) coupled between an input of the cathode section Φ1 switch and a cathode section common mode junction to generate V(CΦ1);
a cathode section Φ2 switch to transfer a Φ2 reference voltage V(CΦ2) to the output CHC of the cathode section of the driver apparatus at a Φ2 switching time;
a cathode section Φ2 voltage source VS(CΦ2) coupled between an input of the cathode section Φ2 switch and the cathode section common mode junction to generate V(CΦ2);
an cathode section impedance matching buffer coupled to an output of the cathode section Φ1 switch and to an output of the cathode section Φ2 switch;
a cathode section impedance matching resistor coupled between an output of the cathode section impedance matching buffer and the output CHC;

a cathode section common mode voltage source VS(CCM) coupled to the cathode section common mode junction to establish a cathode driver output terminal voltage V(CHC); and an operational amplifier coupled as a feedback element between the cathode driver output terminal CHC and the anode section common mode junction, a first input to the operational amplifier coupled to CHC, a second input to the operational amplifier coupled to the cathode section common mode junction, and an output of the operational amplifier coupled to the anode section common mode junction, feedback to the anode section common mode junction to stabilize driver-supplied laser diode current; and a heat and write pulse timing module coupled to the anode section and cathode section Φ1 and Φ2 switches associated with the laser diode driver portion of the HAMR driver system and to the upper and lower section θ1 and θ2 switches associated with the magnetic write head driver portion of the HAMR driver system.

15. The HAMR driver system of claim 14, further comprising:
a magnetic medium to be written to; and
a laser diode to receive current from the laser diode driver section during a time associated with Φ1 timing and to heat a portion of the magnetic medium to be written to.

16. The HAMR driver system of claim 15, further comprising:
a magnetic write head to write data to the heated magnetic medium.

17. The HAMR driver apparatus of claim 14, the upper section θ1 voltage source VS(Uθ1) further comprising:
an upper section θ1 symmetrical component voltage source VS(Uθ1S) to generate a reference voltage V(Uθ1S); and
an upper section θ1asymmetrical component voltage source VS(Uθ1ASYM) to generate a reference voltage V(Uθ1ASYM) less than V(Uθ1S), VS(Uθ1S) and VS(Uθ1ASYM) coupled in additive series to generate an upper section θ1reference voltage sum V(Uθ1S)+V(Uθ1ASYM), the upper section θ1 reference voltage sum to appear at the upper section θ1 switch input terminal.

18. The HAMR driver apparatus of claim 14, the upper section θ2 voltage source VS(Uθ2) further comprising:
an upper section θ2 symmetrical component voltage source VS(Uθ2S) to generate a reference voltage V(Uθ2S); and
an upper section θ2 asymmetrical component voltage source VS(Uθ2ASYM) to generate a reference voltage V(Uθ2ASYM) less than V(Uθ2S), VS(Uθ2S) and VS(Uθ2ASYM) coupled in subtractive series to generate an upper section θ2 reference voltage difference −[V(Uθ2S)−V(Uθ2ASYM)], the upper section θ2 reference voltage difference to appear at the upper section θ2 switch input terminal.

19. The HAMR driver apparatus of claim 14, the lower section θ1 voltage source VS(Lθ1) further comprising:
a lower section θ1 symmetrical component voltage source VS(Lθ1S) to generate a reference voltage V(Lθ1S); and
a lower section θ1 asymmetrical component voltage source VS(Lθ1ASYM) to generate a reference voltage V(Lθ1ASYM) less than V(Lθ1S), VS(Lθ1S) and VS(Lθ1ASYM) coupled in additive series to generate a lower section θ1 reference voltage sum −[V(Lθ1S)+V(Lθ1ASYM)], the lower section θ1 reference voltage sum to appear at the lower section θ1 switch input terminal.

20. The HAMR driver apparatus of claim 14, the lower section θ2 voltage source VS(Lθ2) further comprising:
a lower section θ2 symmetrical component voltage source VS(Lθ2S) to generate a reference voltage V(Lθ2S); and
a lower section θ2 asymmetrical component voltage source VS(Lθ2ASYM) to generate a reference voltage V(Lθ2ASYM) less than V(Lθ2S), VS(Lθ2S) and VS(Lθ2ASYM) coupled in subtractive series to generate a lower section θ2 reference voltage difference −[V(Lθ2S)−V(Lθ2ASYM)], the lower section θ2 reference voltage difference to appear at the lower section θ2 switch input terminal.

* * * * *